United States Patent
Zhang et al.

(10) Patent No.: US 12,212,591 B2
(45) Date of Patent: Jan. 28, 2025

(54) INTRUSION PROTECTION SYSTEM (IPS) FOR HASH-BASED STRING DETECTION WITHOUT MEMORY LOOKUP TABLE

(71) Applicant: Fortinet, Inc., Sunnyvale, CA (US)

(72) Inventors: Yuwei Zhang, Pleasanton, CA (US); Shushan Wen, Pleasant Hill, CA (US)

(73) Assignee: Fortinet, Inc., Sunnyvale, CA (US)

( * ) Notice: Subject to any disclaimer, the term of this patent is extended or adjusted under 35 U.S.C. 154(b) by 244 days.

(21) Appl. No.: 18/081,659

(22) Filed: Dec. 14, 2022

(65) Prior Publication Data

US 2024/0205247 A1 Jun. 20, 2024

(51) Int. Cl.
*H04L 27/06* (2006.01)
*G06F 11/10* (2006.01)
*H04L 9/40* (2022.01)

(52) U.S. Cl.
CPC ...... *H04L 63/1425* (2013.01); *G06F 11/1096* (2013.01); *H04L 63/1416* (2013.01)

(58) Field of Classification Search
CPC ............. H04L 63/1425; H04L 63/1416; G06F 11/1096
See application file for complete search history.

(56) References Cited

U.S. PATENT DOCUMENTS

| | | | | |
|---|---|---|---|---|
| 2003/0053622 A1* | 3/2003 | Bruen | ...................... | H04L 9/304 380/28 |
| 2005/0210179 A1* | 9/2005 | Walmsley | .............. | G06F 21/445 711/3 |
| 2016/0248586 A1* | 8/2016 | Hughes | ................... | H04L 63/08 |
| 2021/0328711 A1* | 10/2021 | Zhou | .................... | H03M 13/154 |

OTHER PUBLICATIONS

Liu et al., "A fast string-matching algorithm for network processor-based intrusion detection system", ACM Transactions on Embedded Computing Systems (TECS), vol. 3, Issue 3, pp. 614-633 (Year: 2004).*

* cited by examiner

*Primary Examiner* — Morshed Mehedi
(74) *Attorney, Agent, or Firm* — Law Office of Dorian Cartwright; Dorian Cartwright (57) ABSTRACT

A CRC rule is generated for each CRC parity check circuit from a bank of CRC parity check circuits for mapping a fixed-length CRC output to a signature, each of the CRC parity check circuits servicing a specific string length. The selected CRC parity circuit outputs a fixed-length parity-check data for the specific data packet, and the string mapper maps the fixed-length parity-check data for the specific data packet to one of the string identifiers associated with the group of signatures. If a fixed-length parity-check match is found, outputting a string identifier of the match for a security action.

8 Claims, 6 Drawing Sheets

INTRUSION PROTECTION SYSTEM (IPS) FOR HASH-BASED STRING DETECTION WITHOUT MEMORY LOOKUP TABLE

FIELD OF THE INVENTION

The invention relates generally to computer security, and more specifically, to an intrusion protection system (IPS) device for hash-based string detection for identifying signatures of variable lengths from data packets using fixed logic memory and without using a memory lookup table for stored signatures.

BACKGROUND

An intrusion prevention system (IPS) protects private networks from malicious file damage and other attacks. An IPS rule, or signature, can be represented as one line of text in an IPS rule file identifying one attack or one application, using payload and protocol-related information, such as strings, protocol types, and/or port numbers. The IPS rules are used to detect if a received data packet contains a signature string previously linked to malicious activity.

This kind string detection is normally based on memory lookup table, which is quite expensive from chip design point of view. For example, 1 million signature strings results in a multi-million gates count ASIC design. In fact, the size of the IPS signature set usually keeps increasing during the reasonable lifespan of an IPS product.

Therefore, what is needed is a robust technique for hash-based string detection of variable length signatures from data packets using fixed logic memory and without using a memory lookup table for stored signatures.

SUMMARY

These shortcomings are addressed by the present disclosure of methods, computer program products, and systems for hash-based string detection for identifying signatures of variable lengths from data packets using fixed logic memory and without using a memory lookup table for stored signatures.

In one embodiment, a cyclic redundancy check (CRC) rule generator to generate a CRC rule for each CRC parity check circuit from a bank of CRC parity check circuits for mapping a fixed-length CRC output to a signature, each of the CRC parity check circuits servicing a specific string length.

In another embodiment, a string ID mapper can analyze the specific data packet to determine whether a character string of the specific data packet matches fixed-length CRC output for at least one of the stored signatures. The character string of the specific data packet is hashed using a CRC parity check circuit corresponding to a length of the character string and a string mapper circuit. The CRC parity circuit outputs a fixed-length parity-check data for the specific data packet, and the string mapper maps the fixed-length parity-check data for the specific data packet to one of the string identifiers associated with the group of signatures. If a fixed-length parity-check match is found, outputting a string identifier of the match for a security action.

Advantageously, computer device performance, and also network performance, are improved with more efficient network security.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for hash-based string detection of variable length signatures from data packets using fixed logic memory and without using a memory lookup table for stored signatures. One of ordinary skill in the art will recognize many additional variations made possible by the succinct description of techniques below.

I. IPS Systems for Hash-Based String Detection Using Logic Memory (FIGS. 1-2)

Figure 1:
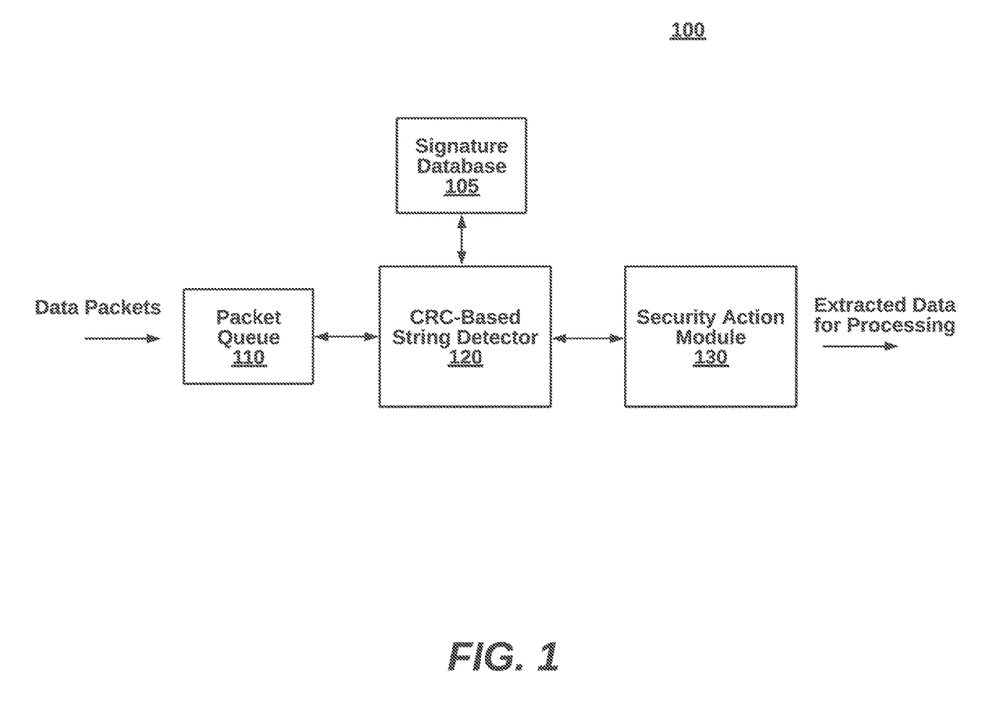
FIG. 1 is a block diagram illustrating an IPS device for hash-based string detection for identifying signatures of variable lengths from data packets using fixed logic memory and without using a memory lookup table for stored signatures, according to an embodiment.

FIG. 1 is a block diagram illustrating an IPS system 100 for hash-based string detection of variable length signatures from data packets using fixed logic memory and without using a memory lookup table for stored signatures, according to an embodiment. The system 100 includes a signature database 105, a packet queue 110, a CRC based string detector 120, and a security action module 130. Other network components can be present, such as network gateways, access points, controllers, switches, stations, and the like. Many other configurations are possible.

The packet queue 110 can receive data packets in real time from a data communication network. A network interface can be connected by wire to a data communication network to receive analog signals representing digitized packets of data. A session of data packets is a set of data packets between a common source and destination, over a window of time. A portion of one or more data packets is extracted and fed into the CRC-based string detector 120 to determine whether there are any matching signatures in the signature database 105. If so, the security action module 130 can automatically quarantine, isolate, repair, or take other actions to protect an entity network. If there is no match, the data packets can be passed on for safe processing. Some embodiments analyze a sample of data packets from a session rather than each data packet, for efficiency.

Figure 2:
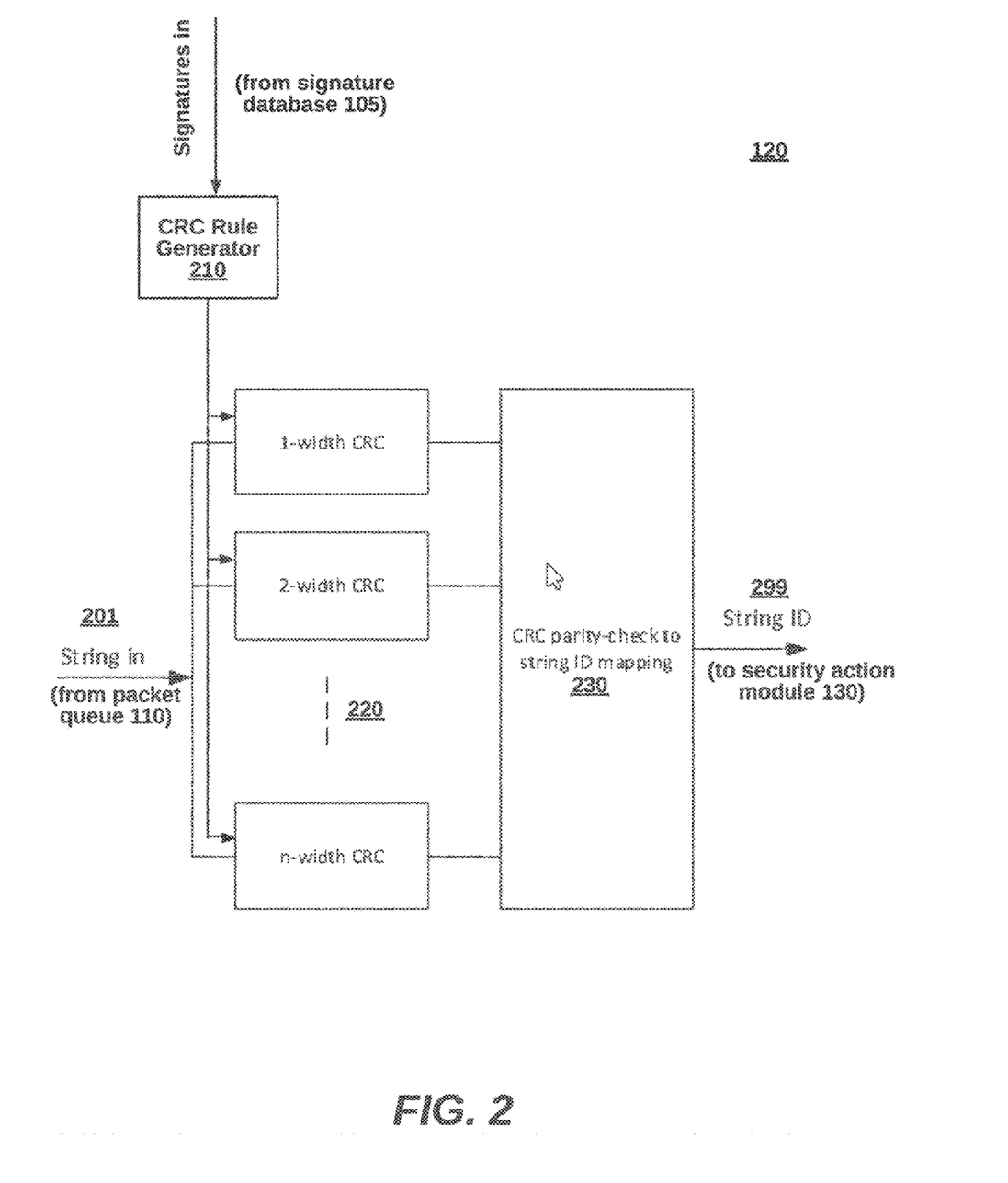
FIG. 2 is a more detailed block diagram illustrating a bank of CRC-parity encoders of the system of FIG. 1, according to an embodiment.

The CRC-based string detector 120 is detailed in FIG. 2, according to an embodiment. The CRC-based string detector 120 further comprises a CRC rule generator 210, a bank of CRC parity-check encoders 220 and a string ID mapper 230.

In operation, a character string 201 is input and a string ID 299 is output, when a match occurs. The bank of CRC parity-check encoders 220 is communicatively coupled with the string ID mapper 230. The CRC rule generator 210 is communicatively coupled to each of the bank of CRC parity-check encoders 120. The character string 101 can be sent from a packet queue 105. The string ID 299 can be sent to a security action module. Many other layouts are possible.

The signature database 105 receives, prior to deployment to real-time network traffic, a group of rule-based signatures that are known to be malicious. Each signature comprises a string identifier, a string length, and a character string. One example input of sixteen signatures includes:

00, 6, 7d f9 78 ae 3c a9
01, 9, 74 93 a9 ee 84 39 a9 e6 ef
02, 5, 88 b2 04 08 94
03, 4, c4 10 87 ef
04, 4, 7b 36 15 18
05, 6, f6 df fd 7f 3d db
06,12,2a 39 5f 6f aa e8 22 3d 89 2e 12 fd
07, 12, a1 c7 79 89 7f f5 fa 83 14 70 5f 05
08, 4, 87 c4 62 9e
09, 6, 64 8c 7e 8d 99 10
10, 6, d5 c8 fa dd c9 e4
11, 3, 74 8f e2
12,6,2a fe 62 dd da 9c
13, 7, e5 93 d1 a2 69 65 a7
14, 12, 1b 60 60 d2 7c b3 1f 80 04 1d b2 5f
15, 11, c8 98 11 d2 93 bc 7d e2 d3 aa b3

In each line of above rule, the first number is string ID, the second number is the string length in byte, and then the hex representation of chars of the string. The rule file defines sixteen different signature strings with string length varying from 3 to 12 bytes.

The CRC rule generator 210 configures an CRC rule for each CRC parity check circuit from a bank of CRC parity check circuits for mapping a fixed-length CRC output to a signature. The rules are transformed to a short sequence of bits.

The bank of CRC parity check encoders 220 includes a CRC parity check circuit servicing each specific string length. Generally, an encoder can take strings with different length in byte to output a fixed-length parity-check data. The second number of the signatures above indicate string length, and in one embodiment, determines which encoder is selected from bank for a particular character string. An individual encoder servicing a particular length is programmed with a sequence distinct from encoders servicing different lengths. Preferably, encoders are implemented in hardware using semiconductor technology for high speeds. Some embodiments are implemented with a combination of hardware and software.

The string ID mapper 230 analyzes the specific data packet to determine whether a character string of the specific data packet matches fixed-length CRC output for at least one of the stored signatures. A key aspect of the system is the CRC parity-check to string ID mapping block. It detects if the input string belongs to IPS signature or not without memory lookup table. If a fixed-length parity-check match is found, outputting a string identifier of the match for a security action.

In more detail, a packet queue can receive data packets in real-time network traffic from the data communication network, for temporary storage. A character string of a specific data packet is extracted and hashed using a CRC parity check circuit corresponding to a length of the character string and a string mapper circuit. The CRC parity circuit outputs a fixed-length parity-check data for the specific data packet, and the string mapper maps the fixed-length parity-check data for the specific data packet to one of the string identifiers associated with the group of signatures.

III. Methods for IPS with Hash-Based String Detection Using Logic Memory (FIGS. 3-4)

Figure 3:
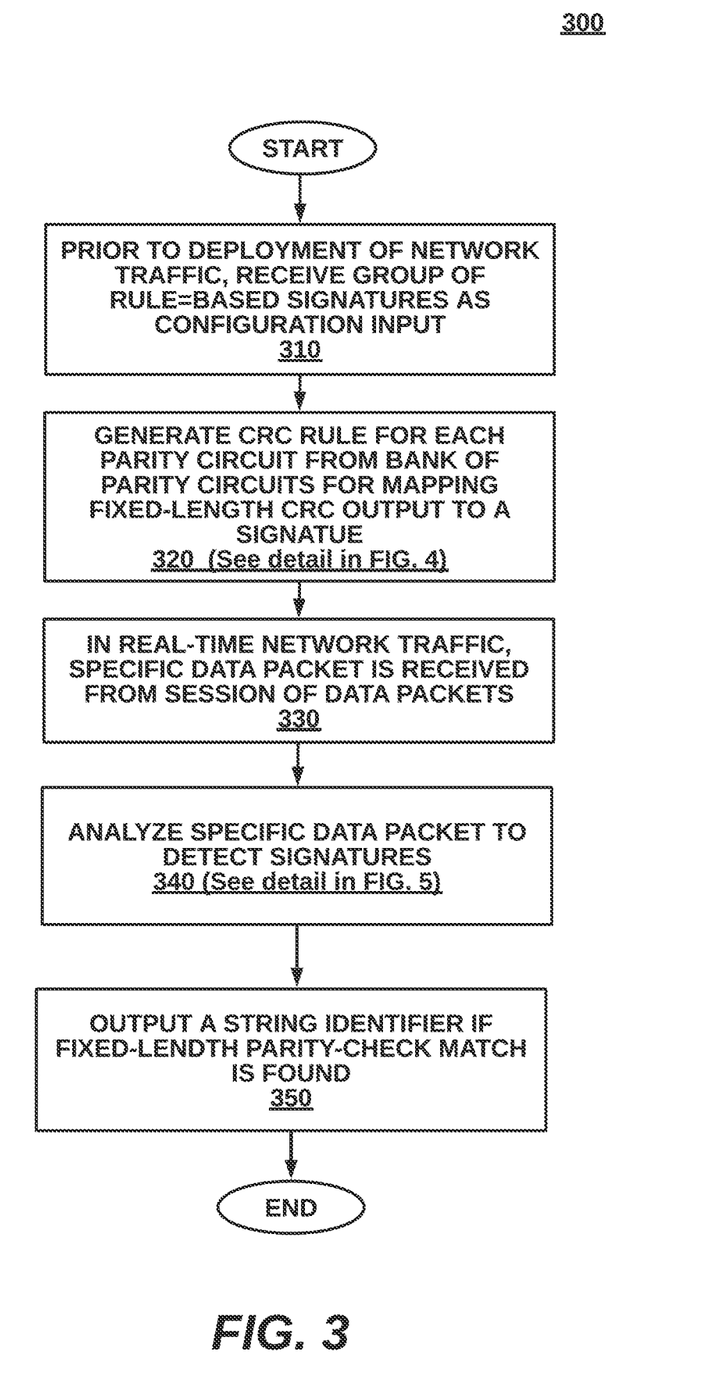
FIG. 3 is a high-level flow diagram illustrating a method for hash-based string detection for identifying signatures of variable lengths from data packets using fixed logic memory and without using a memory lookup table for stored signatures, according to an embodiment.
Figure 4:
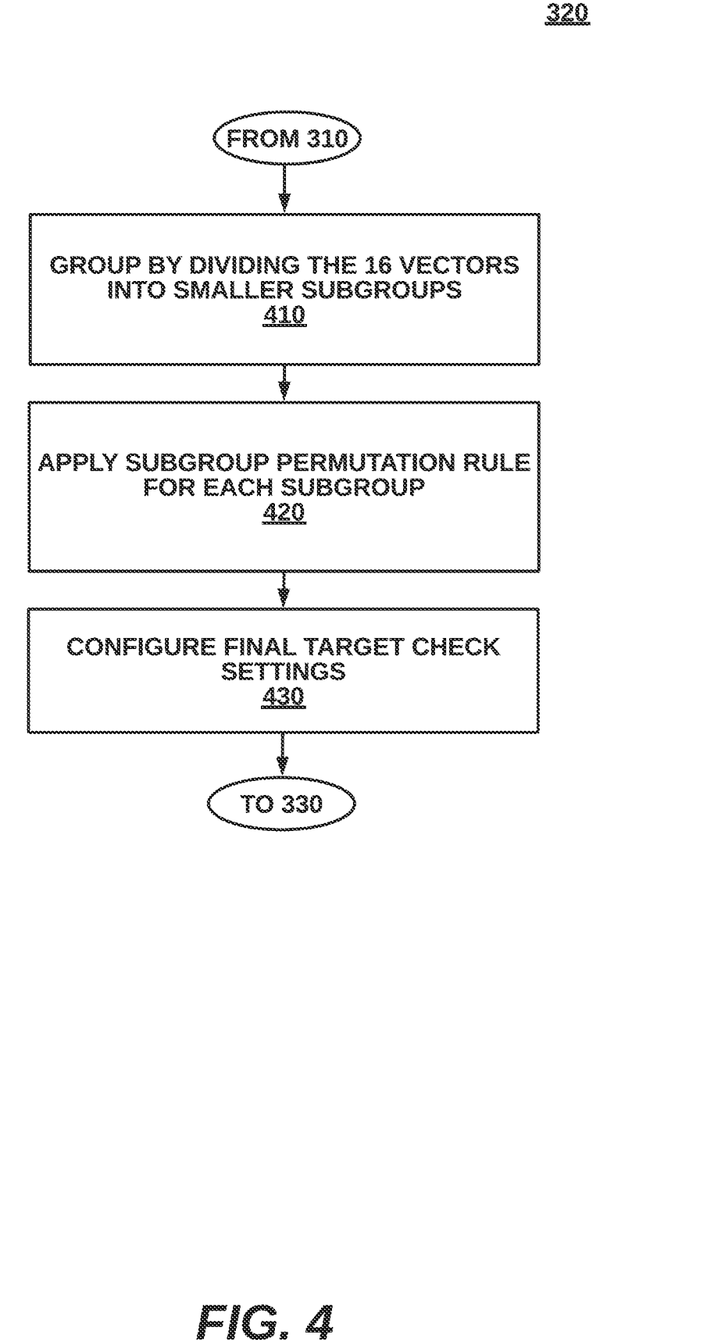
FIG. 4 is a more detailed flow diagram illustrating a step of CRC rule generation from the method of FIG. 3, according to an embodiment.

FIG. 3 is a high-level flow diagram illustrating a method 300 for hash-based string detection for identifying signatures of variable lengths from data packets using fixed logic memory and without using a memory lookup table for stored signatures, according to one preferred embodiment. The method 300 can be implemented, for example, by the system 100 of FIG. 1. The steps are merely representative groupings of functionality, as there can be more or fewer steps, and the steps can be performed in different orders. Many other variations of the method 300 are possible.

At step 310, prior to deployment to real-time network traffic, a group of rule-based signatures is received as configuration input. Each signature comprising a string identifier, a string length, and a character string.

At step 320, a CRC rule is generated for each CRC parity check circuit from a bank of CRC parity check circuits for mapping a fixed-length CRC output to a signature. Each of the CRC parity check circuits services a specific string length and is programmed with a sequence representative of a set of signatures. An example of CRC rule generation is set forth in more detail below with respect to FIG. 4.

At step 330, in real-time network traffic, a specific data packet is received from a session of data packets on the data communication network.

At step 340, the specific data packet is analyzed to detect signatures. It is determined whether a fixed-length CRC output for a character string of the specific data packet matches a fixed-length CRC output for at least one of the stored signatures, as described in association with FIG. 5.

At step 350, if a fixed-length parity-check match is found, a string identifier of the match is output for a security action. Consequently, a private network can quarantine, isolate, block, or take other remediation actions on the incoming packets and their applications.

FIG. 4 is a flow diagram illustrating the step 320 of generating rules for CRC parity-check encoders, according to an embodiment.

In one embodiment, a CRC32 with generation polynomial $g(x)=x^{32}+x^{26}+x^{23}+x^{22}+x^{16}+x^{12}+x^{11}+x^{10}+x^8+x^7+x^5+x^4+x^2+x+1$ as our hash device. With this CRC32, the parity-check data of our 16 signatures string are:

[1010010011110110001100111110101 1

0101111000101111000101000001 1011

1111111111111110100110011011011

1001101001001010001011110100111 1

111100000100111111000001100100000

0001111011100100110001011011001 1

000100110111011000011001100011 11

10111100011011000011111010100110

11100111011010100011111101000110

00101111011000100001001001010 1

0101001101000010001010111111000 0

110001011001101111110000110111110]

-continued

11000110010000001100011001001101

00001110110111101001001110100011

00001011110000100000110010010110

11000011011011110110000100001110]

The data can be considered as a 16×32 matrix. In rank analyses, its rank equals to 16, meaning the 16 row vectors are independent from each other. Next, common characteristics of the data are leveraged in method in FIG. 4 to program CRC-parity encoders.

At step 410, grouping is performed by dividing the 16 vectors into smaller subgroups. For above example, the grouping is actually shifting the 2nd and 4th columns of the above 16×32 matrix to its 1st two columns. One embodiment is implemented according to following pseudo code:

Let number of row vectors as N.
1. Search the column vector to which column contains N/2 "1"s. If can't find this column, then grouping is done. if N isn't an even number, we can duplicate one row vector.
2. Move that column to the first column of the entire N vectors.
3. For the column permutated vectors, put the vectors whose first bit is "1"
into the $1^{st}$ sub-group; others into $2^{nd}$ sub-group.
4. Repeat step 1~3 on each sub-group until a sub-group can't be divided.

With above grouping rule, the 16 vectors can be further divided into 4 subgroups as below, which are distinguished by the first two columns as 11, 10, 01, and 00, respectively.

[1100 1110 0010 1111 0001 0100 0001 1011

1111 1111 1111 1111 0100 1100 1101 1011

1111 0000 0100 1111 1100 0011 0010 0000

1100 0011 0100 0010 0010 1101 1111 0000]

[10110111011010100011111101000110

10100101100110111110000110111110

10100110010000001100011001001101

10100011101101111011000010000110]

[01101010010010100010111101001111

01001110111001001100010110111001

01000011011101100001100110001111

01111100011011000011111010100110]

[00110100111011000110011111101011

00011111101100010000100100110101

00001110110111101001001110100011

00001011110000100000110010010110]

The bit position of each original row vector is labeled as 1 2, . . . 32. After grouping, the 1st bit of the grouped vector is the 2nd bit of the original vector. The 2nd bit of the grouped vector is the 4th bit of the original vector. For clearness, the row vectors are re-ordered. Compared with the original row vectors, the bit position of the grouped vectors follows the order [2, 4, 1, 3, 5, 6, . . . , 32]. Therefore, the grouping is in fact a bit position permutation.

At step 420, apply subgroup permutation rule for each subgroup. For the above 4 subgroups, use decimal expression for each column, then the 4 subgroup vectors can be expressed as:

[15 15 6 6 12 12 13 5 4 7 12 4 14 14 15 14 2 6 1 8 5 13 2 3 5 5 3 13 12 0 12 12]

[15 0 15 8 0 14 11 13 5 10 9 5 12 1 13 5 7 6 13 9 8 10 10 12 5 10 4 4 6 15 13 2]

[0 15 9 1 13 5 14 2 4 15 7 2 9 7 10 0 4 4 9 3 11 13 9 14 7 8 5 4 14 11 11 14]

[0 0 8 12 7 14 7 5 15 11 12 14 2 10 11 4 2 0 8 10 5 1 10 14 11 8 14 5 8 5 11 14]

For the first subgroup above, its first three decimal expressions are 15, 15 and 6. It is because its 4 row vectors have [1, 1, 1, 1], [1, 1, 1, 1] and [0, 1, 1, 0] at its first 3 columns. Other columns just follow the same method.

Ignore the first 2 columns (it represents the index of subgroups), and sort the remaining column's decimal expression in increasing order. It is a column permutation within each subgroup. With this operation, the first subgroup becomes:

[0, 1, 2, 2, 3, 3, 4, 4, 5, 5, 5, 5, 6, 6, 6, 7, 8, 12, 12, 12, 12, 12, 12, 13, 13, 13, 13, 14, 14, 14, 15]

It is corresponding to bit position of the original row vectors in following orders:

[30, 19, [17, 23], [24, 27], [9, 12], [8, 21, 25, 26], [1, 3, 18], 10, 20, [5, 6, 11, 29, 31, 32], [7, 22, 28], [13, 14, 16], 15].

This is a bit position permutation rule. The permutation rule shows that the 30th bit of the original CRC parity-check data is moved to the 1st bit location of the sorted vector. The 19th bit of the original CRC parity-check data is moved to the 2nd bit location of the sorted vector, and so on.

In bit position permutation, the items [x, . . . x], such as [17, 23], [24, 27] . . . , denotes that original CRC parity-check data takes the same value on these positions, i.e., they could be all "0"s or all "1"s. This is subgroup screening rule, used to screen if the string is a signature string.

The same as the first subgroup, the second subgroup can be sorted as

[0, 1, 2, 4, 4, 5, 5, 5, 5, 6, 7, 8, 8, 9, 9, 10, 10, 10, 10, 11, 12, 12, 13, 13, 13, 13, 14, 15, 15]

With bit position permutation rule

[5, 14, 32, [27, 28], [9, 12, 16, 25], [18, 29], 17, [3, 21], [11, 20], [10, 22, 23, 26], 7, [13, 24], [8, 15, 19, 31], 6, [1, 30] ]

The 3rd subgroup can be sorted as

[0, 1, 2, 2, 3, 4, 4, 4, 4, 5, 5, 7, 7, 7, 8, 9, 9, 9, 9, 10, 11, 11, 11, 13, 13, 14, 14, 14, 14, 15]

With bit position permutation rule

[16, 3, [8, 12], 20, [9, 17, 18], [6, 27], [11, 14, 25], 26, [1, 13, 19, 23], 15, [21, 30, 31], [5, 22], [7, 24, 29, 32], 10]

And the 4th subgroup can be sorted as [0, 1, 2, 2, 4, 5, 5, 5, 5, 7, 7, 8, 8, 8, 8, 10, 10, 10, 11, 11, 11, 11, 12, 12, 14, 14, 14, 14, 14, 15]

With bit position permutation rule

[18, 22, [13, 17], 16, [8, 21, 28, 30], [5, 7], [1, 19, 26, 29], [14, 20, 23], [10, 15, 25, 31], [3, 11], [6, 12, 24, 27, 32], 9]

At step 430, a final target check is performed. In above sorted decimal expression subgroup vectors, merge the same value positions into one, then we get

[0, 1, 2, 3, 4, 5, 6, 7, 8, 12, 13, 14, 15]===>[0, 1, 2, 3, 4, 5, 6, 7, 8, 9i, 10i, 11i, 12, 13, 14, 15]

[0, 1, 2, 4, 5, 6, 7, 8, 9, 10, 11, 12, 13, 14, 15]===>[0, 1, 2, 3i, 4, 5, 6, 7, 8, 9, 10, 11, 12, 13, 14, 15]

[0, 1, 2, 3, 4, 5, 7, 8, 9, 10, 11, 13, 14, 15]===>[0, 1, 2, 3, 4, 5, 6i, 7, 8, 9, 10, 11, 12i, 13, 14, 15]

[0, 1, 2, 4, 5, 7, 8, 10, 11, 12, 14, 15]===>[0, 1, 2, 3i, 4, 5, 6i, 7, 8, 9i, 10, 11, 12, 13i, 14, 15]

In right side of above expression, Xi means we insert number X in this position for getting the final target [0, 1, 2, 3, 4, 5, 6, 7, 8, 9, 10, 11, 12, 13, 14, 15]. Why?

If we express the final target as 4 binary sequences, then we can see

0000000011111111

0000111100001111

0011001100110011

0101010101010101

These 4 sequences have clear pattern which can be identified with a simple logic. For the inserted locations, they can be ignored for final target checking.

Figure 5:
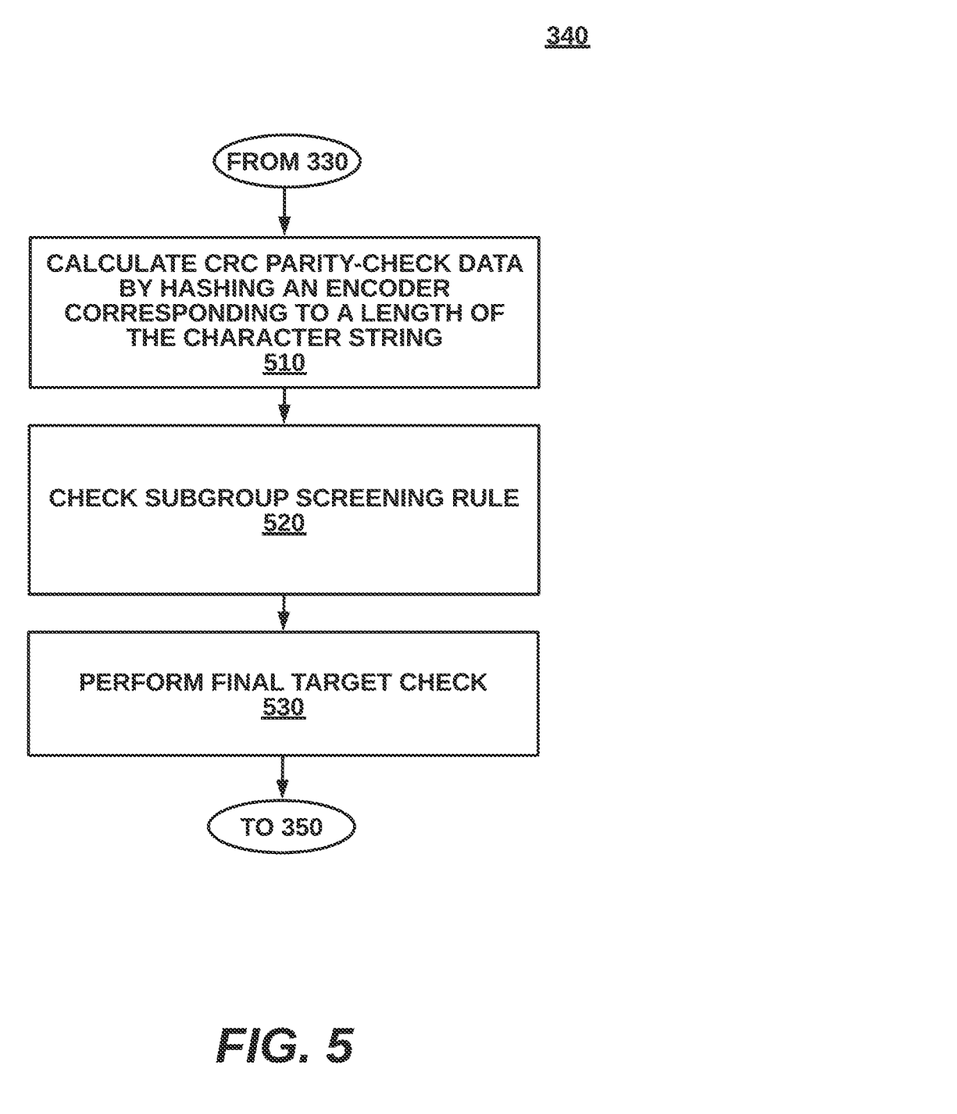
FIG. 5 is a more detailed flow diagram illustrating a step of string detection from the method of FIG. 3, according to an embodiment.

FIG. 5 is a more detailed flow diagram for the step 330 of detecting a signature string, from the method 300 of FIG. 3, according to an embodiment. The character string of the specific data packet is hashed using a CRC parity check circuit corresponding to a length of the character string and a string mapper circuit, wherein the CRC parity circuit outputs a fixed-length parity-check data for the specific data packet, and the string mapper maps the fixed-length parity-check data for the specific data packet to one of the string identifiers associated with the group of signatures.

At step 510, CRC parity-check data is calculated by hashing with an encoder corresponding to a length of the character string. Find which subgroup it belongs to by its group index bits (bit 2 and 4 for the above rules).

At step 520, a subgroup screening rule is checked. If a rule is passed, go to final target check. Otherwise, the process can be stopped because it is not a signature string.

At step 530, a final target check is performed. If the final target check passes, it is a signature string. Otherwise, it is not a signature string. In fact, the detection processing contains the information about which signature string is found, so the string ID can be reported.

IV. Computing Environment (FIG. 6)

Figure 6:
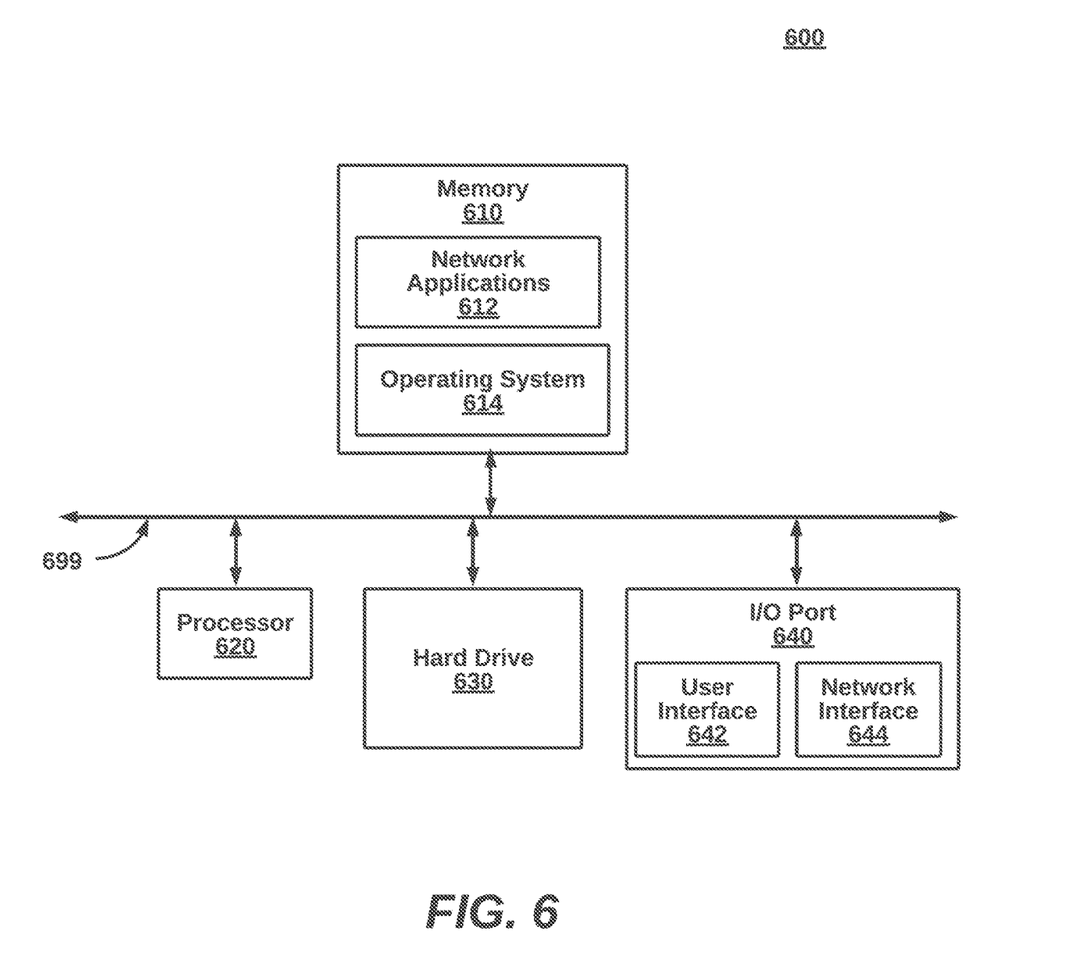
FIG. 6 is a high-level block diagram illustrating a computing device as an example hardware implementation of network devices herein, according to an embodiment.

FIG. 6 is a block diagram illustrating a computing device 600 capable of implementing components of the system 100 of FIG. 1, according to an embodiment. The computing device 600 of the present embodiment, includes a memory 610, a processor 620, a storage drive 630, and an I/O port 640. Each of the components is coupled for electronic communication via a bus 699. Communication can be digital and/or analog and use any suitable protocol. The computing device 600 can be any of components of the system 100, other networking devices (e.g., the signature database 105), or a disconnected device.

Network applications 612 (e.g., the CRC rule generator 210) can be network browsers, daemons communicating with other network devices, network protocol software, and the like. An operating system 614 within the computing device 600 executes software, processes. Standard components of the real OS environment 614 include an API module, a process list, a hardware information module, a firmware information module, and a file system. The operating system 614 can be FORTIOS, one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g., an RF antennae) connects to a medium such as Ethernet or Wi-Fi for data input and output. Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method in an intrusion protection system (IPS) device on a data communication network for hash-based string detection of variable length signatures from data packets using fixed logic memory and without using a memory lookup table for stored signatures, the method comprising:
   receiving, prior to deployment to real-time network traffic, a group of rule-based signatures as configuration input, each signature comprising a string identifier, a string length, and a character string;
   generating a cyclic redundancy check (CRC) rule for each CRC parity check circuit from a bank of CRC parity check circuits for mapping a fixed-length CRC output to a signature, each of the CRC parity check circuits servicing a specific string length;
   receiving, in real-time network traffic, a specific data packet from a session of data packets on the data communication network;
   analyzing the specific data packet to determine whether a character string of the specific data packet matches fixed-length CRC output for at least one of the stored signatures, wherein the character string of the specific data packet is hashed using a CRC parity check circuit corresponding to a length of the character string to output a fixed-length parity-check data for the specific data packet, and wherein a string mapper maps the fixed-length parity-check data for the specific data packet to one of the string identifiers associated with the group of signatures; and
   if a fixed-length parity-check match is found, outputting a string identifier of the match to a signature-based rule for a security action.

2. The method of claim 1, wherein the step of generating the CRC rules comprises:
   dividing each signature of the group of signatures into a subgroup based on string length,
   hashing each signature with one of the CRC parity check circuits selected by string length, to determine a fixed length CRC output for each signature, and
   storing the fixed-length CRC output for each signature in association with at least one of the signatures as a baseline for identifying the signature.

3. The method of claim 1, wherein the step of analyzing the specific data packet further comprises:
   checking subgroup screening rule; and
   performing a final target check.

4. The method of claim 1, further comprising: taking a security action based on the signature associated with the string identifier.

5. The method of claim 1, wherein at least one more data packet from the session is analyzed for signature matching.

6. A non-transitory computer-readable media storing source code in an intrusion protection system (IPS) device on a data communication network that, when executed by a processor, performs a method for hash-based string detection of variable length signatures from data packets using fixed logic memory and without using a memory lookup table for stored signatures, the method comprising the steps of:
   receiving, prior to deployment to real-time network traffic, a group of rule-based signatures as configuration input, each signature comprising a string identifier, a string length, and a character string;
   generating a cyclic redundancy check (CRC) rule for each CRC parity check circuit from a bank of CRC parity check circuits for mapping a fixed-length CRC output to a signature, each of the CRC parity check circuits servicing a specific string length;
   receiving, in real-time network traffic, a specific data packet from a session of data packets on the data communication network;
   analyzing the specific data packet to determine whether a character string of the specific data packet matches fixed-length CRC output for at least one of the stored signatures,
   wherein the character string of the specific data packet is hashed using a CRC parity check circuit corresponding to a length of the character string and a string mapper circuit, wherein the CRC parity circuit outputs a fixed-length parity-check data for the specific data packet, and the string mapper maps the fixed-length parity-check data for the specific data packet to one of the string identifiers associated with the group of signatures; and
   if a fixed-length parity-check match is found, outputting a string identifier of the match for a security action.

7. The method of claim 1, wherein the step of generating the CRC rules comprises:

dividing each signature of the group of signatures into a subgroup based on string length, hashing each signature with one of the CRC parity check circuits selected by string length, to determine a fixed length CRC output for each signature, and storing the fixed-length CRC output for each signature in association with at least one of the signatures as a baseline for identifying the signature.

8. An intrusion protection system (IPS) device on a data communication network for hash-based string detection of variable length signatures from data packets using fixed logic memory and without using a memory lookup table for stored signatures, comprising:

a signature database to receive, prior to deployment to real-time network traffic, a group of rule-based signatures as configuration input, each signature comprising a string identifier, a string length, and a character string;

a cyclic redundancy check (CRC) rule generator to generate a CRC rule for each CRC parity check circuit from a bank of CRC parity check circuits for mapping a fixed-length CRC output to a signature, each of the CRC parity check circuits servicing a specific string length;

a packet queue to receive, in real-time network traffic, a specific data packet from a session of data packets on the data communication network;

a string ID mapper to analyze the specific data packet to determine whether a character string of the specific data packet matches fixed-length CRC output for at least one of the stored signatures, wherein the character string of the specific data packet is hashed using a CRC parity check circuit corresponding to a length of the character string and a string mapper circuit, wherein the CRC parity circuit outputs a fixed-length parity-check data for the specific data packet, and the string mapper maps the fixed-length parity-check data for the specific data packet to one of the string identifiers associated with the group of signatures, and wherein if a fixed-length parity-check match is found, outputting a string identifier of the match for a security action.

* * * * *